United States Patent [19]

Jensen et al.

[11] Patent Number: 6,038,575

[45] Date of Patent: Mar. 14, 2000

[54] METHOD OF SHARING GLYPHS BETWEEN COMPUTERS HAVING GRAPHICAL USER INTERFACES

[75] Inventors: David A. Jensen, American Fork; Paul B. Hillyard, Lindon, both of Utah

[73] Assignee: Intel Corporation, Santa Clara, Calif.

[21] Appl. No.: 08/712,859

[22] Filed: Sep. 11, 1996

[51] Int. Cl.$^7$ .............................. G06H 15/00; G06T 1/00
[52] U.S. Cl. ............................................. 707/542; 345/467
[58] Field of Search ..................... 707/542, 531, 707/530; 345/467, 471, 116, 326, 329, 115, 416, 418, 433, 133

[56] References Cited

U.S. PATENT DOCUMENTS

| | | | |
|---|---|---|---|
| 5,241,625 | 8/1993 | Epard et al. | |
| 5,598,520 | 1/1997 | Harel et al. | 395/169 |
| 5,758,110 | 5/1998 | Boss et al. | 395/329 |
| 5,771,034 | 6/1998 | Gibson | 345/141 |

*Primary Examiner*—Stephen S. Hong
*Assistant Examiner*—Alford W. Kindred
*Attorney, Agent, or Firm*—Blakely, Sokoloff, Taylor & Zafman LLP

[57] ABSTRACT

A method of sharing glyphs between a source computer and a destination computer having graphical user interfaces includes the step of receiving a first request to display a specified glyph at a first position of a source computer display. A glyph bitmap is created from the specified glyph if an identical glyph was not previously sent to the destination computer. The glyph bitmap is sent to the destination computer. The first request is also sent to the destination computer. The destination computer stores the received glyph bitmap. The first request received by the destination computer is replaced by a second request. In response to the second request, the second computer copies the glyph bitmap to the first position on a destination computer display.

25 Claims, 8 Drawing Sheets

SOURCE DISPLAY

DESTINATION (OBSERVER'S) DISPLAY

METHOD OF SHARING GLYPHS BETWEEN COMPUTERS HAVING GRAPHICAL USER INTERFACES

FIELD OF THE INVENTION

This invention relates to the field of computers. In particular, this invention is drawn to methods for providing glyphs from a source computer having a graphical user interface to a destination computer for accuracy in modeling the source computer display.

BACKGROUND OF THE INVENTION

Training and trouble shooting for computer systems have been enhanced by the ability to observe them and optionally control them remotely. Software products such as Norton pcANYWHERE® (produced by Symantec Corporation) and Timbuktu® (produced by Farallon Computing, Inc. of Alameda, California) permit remote observation and control of information displayed on a first computer from a second computer. These remote control software products may permit the controlling computer (observer) to provide commands to the controlled computer (observed) as if the commands are being typed on the local keyboard or provided through some other input/output device locally connected to the controlled computer. The ability to remotely observe and control a first computer from a second computer is particularly useful for training or for troubleshooting the first computer from a remote location.

In order to be effective, the display of the observing computer should accurately reflect the display of the observed computer, especially if the observed computer uses a graphical user interface. The display of the observing computer may or may not accurately reflect the display of the observed computer, depending upon the methods used to mimic the display of the observed computer. This may be particularly true with respect to the typeface, style, size, etc. of characters or glyphs displayed by the observed computer.

Graphical user interfaces are typically associated with message or event driven operating systems. A text output message is issued, for example, when text is to be sent to an output device such as a computer display. The text output message typically identifies the fonts and the glyphs or characters within the font that are to be output to the display. In response to the text output message, some component of the operating system composes the text using the specified fonts and glyphs. The composed text is then displayed by the source computer.

One technique used to mimic the display of an observed computer is simply to forward a copy of the text output message to the observing computer. The observed computer becomes the "source" computer for the display-oriented messages. The observing computer becomes a "destination" computer for the display-oriented messages.

FIG. 1 illustrates an architectural data flow diagram for using display messages produced by a source computer to model the source computer display when the source and destination computers have a message-based operating system such as Microsoft® Windows® (produced by Microsoft Corporation, Redmond, Wash.).

The text output message is communicated from the source computer to the destination computer. Upon receipt, the text output message is acted upon by the operating system of the destination computer to compose and display the text. The text output message instructs the destination computer to display text at a given location using specified glyphs or characters from an identified font. Ideally, the text output message produces text on the destination computer display that is identical to the text produced on the source computer display.

One drawback to this technique is that the destination computer must have all the fonts and glyphs referred to in the text output message in order to ensure accurate reproduction of the text. Thus one disadvantage of this technique is that the source computer may have glyphs which are otherwise unavailable to the graphics level of the destination computer.

One solution to this disadvantage is to perform a "best match" on the destination computer. In other words, a "best match" is performed to match the glyph with a glyph already existing on the destination computer. This might be realized, for example, by substituting glyphs from the same or a similar-looking font. One disadvantage of this solution, however, is that typeface, stroke weight, or size of the best match glyph may be significantly different from the original glyph if all the fonts on the source computer are not similarly available to the destination computer. FIG. 2 illustrates the disparity in appearance resulting from a font substitution.

Another method of ensuring accurate reproduction of glyphs is to initially send font data structures such as font masks and spacing from the source computer to the destination computer so that the appropriate glyphs can be generated by the destination computer when required. Unfortunately the source and destination computers may use operating systems which do not support the same data structures or the same format of font data structures.

A method of sharing glyphs displayed by an source computer with a destination computer is needed to ensure accurate rendering of the display of the source computer by the display of the destination computer, especially if the source and destination computers use operating systems having a graphical user interface.

SUMMARY OF THE INVENTION

In view of limitations of known systems and methods, one of the desires of the present invention is to provide a method for sharing glyphs between computers having graphical user interfaces. The glyph to be displayed by an observed first computer (source) is provided to an observing second computer (destination).

A method of sharing glyphs between a source computer and a destination computer having graphical user interfaces includes the step of receiving a first request to display a specified glyph at a first position of a source computer display. A glyph bitmap is created from the specified glyph if an identical glyph was not previously sent to the destination computer. The glyph bitmap is sent to the destination computer. The first request is also sent to the destination computer. The destination computer stores the received glyph bitmap. The first request received by the destination computer is replaced by a second request. In response to the second request, the second computer copies the glyph bitmap to the first position on a destination computer display.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
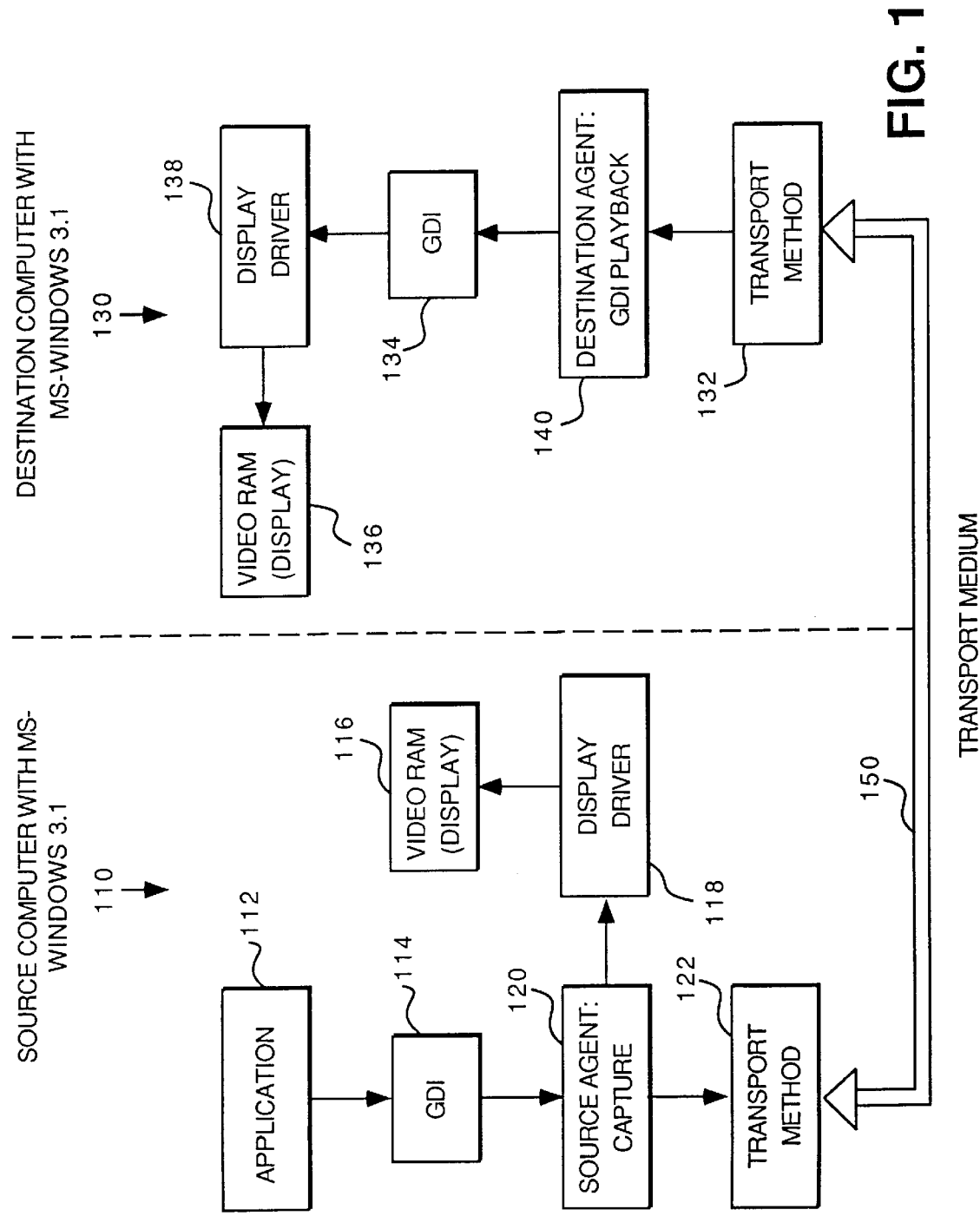
FIG. 1 illustrates an architectural data flow diagram for communicating messages issued by a source computer to a destination computer having the same operating system.

FIG. 1 illustrates a data flow diagram for sharing the display of a source computer 110 with an observing destination computer 130. In the example presented in FIG. 1, both the source 110 and destination 130 computers use the Microsoft® Windows® 3.1 (hereinafter "Windows 3.1") operating system which is a message-based operating system with a graphical user interface.

Operating systems functions are accessed by applications through an application programming interface, or API. An API is a set of subroutine-like procedures or functions that applications can call to open files, allocate memory, and perform other tasks. These functions may be implemented in various layers or modules of the operating system.

For example Microsoft® Windows® 95 (hereinafter "Windows 95") and Windows 3.1 implement API functions in modules which are divided according to general categories of functionality. Windows 95 and Windows 3.1 each include a KERNEL module, a USER module, and a GDI module. Each of these modules may also have associated libraries of API functions. The KERNEL module handles memory and process management. The USER module is primarily responsible for window management. The Graphics Device Interface (GDI) module is responsible for output to devices such as the display and the printer. Although these operating systems have similarly divided functionality into modules, the function calls for performing specific functions may be very different.

In order to write text to a display screen or print it to a printer, a message or function call describing the characteristics and desired location of the text is provided to the GDI module. Referring to FIG. 1, on the source computer side, whenever application 112 issues a text output message the message is received by the Graphics Device Interface (GDI) 114 component of the operating system. The GDI 114 composes the text in accordance with the text output message and prepares the composed text for output by display driver 118. In the embodiment illustrated, a source agent 120 executing on the source computer intercepts messages for display driver 118. The source agent 120 sends the intercepted message to display driver 118. Display driver 118 creates an image specific to the display used by the source computer. Display driver 118 then sends the image to video memory 116 which is associated with the source computer display.

Source agent 120 also communicates the text output message to the destination computer. The communication of the messages using transport method 122, transport medium 150, and transport method 132 is well known in the art and is described, for example, in U.S. Pat. No. 5,241,625 of Epard, et al. which is incorporated herein by reference.

A destination agent 140 executing on the destination computer receives the communicated text output message. In this embodiment, the destination agent 140 forwards the received message to the GDI 134 of the destination computer operating system because the source and destination computers are using the same operating system. Thus in this example, the destination agent serves to "playback" the received message to GDI 134. As was the case with the source computer GDI 114, GDI 134 composes the text in accordance with the text output message for destination computer display driver 138. Display driver 138 then creates an image specific to the destination display. Display driver 138 then sends the image video memory 136 which is associated with the destination display.

The destination computer display may not accurately reflect the source computer display, if the destination computer does not have the identical fonts and glyphs specified by the text output message. Although the GDI 134 may attempt to substitute a different font for the specified font, the substituted font will generally result in a display which does not match the source computer display. This may be particularly noticeable in a graphical user interface environment.

Figure 2:
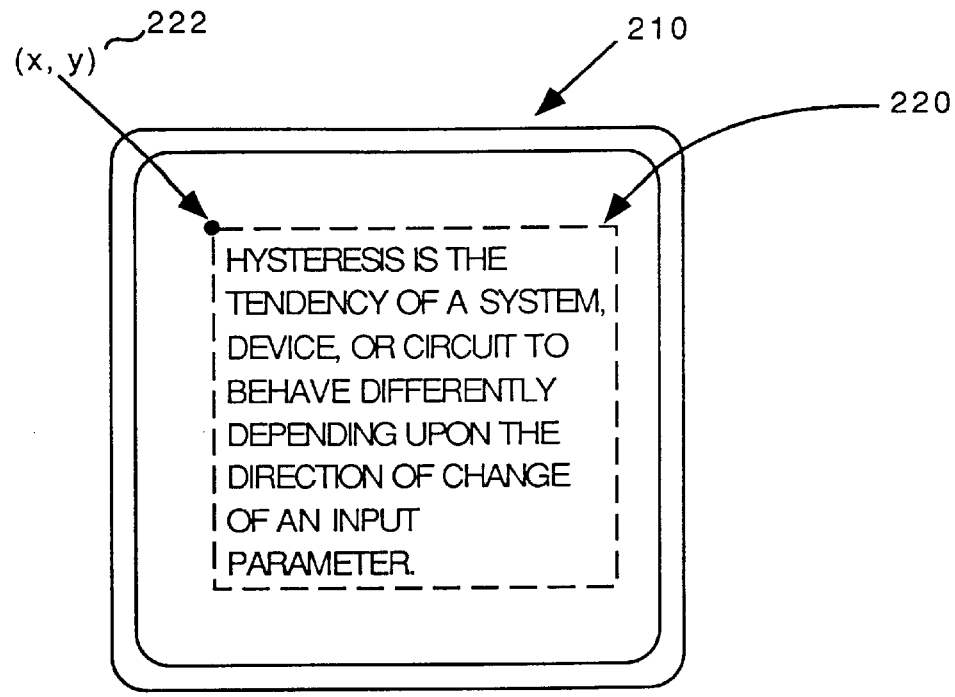
FIG. 2 illustrates results of "best fit" font substitution on the destination computer display.
Figure 2:
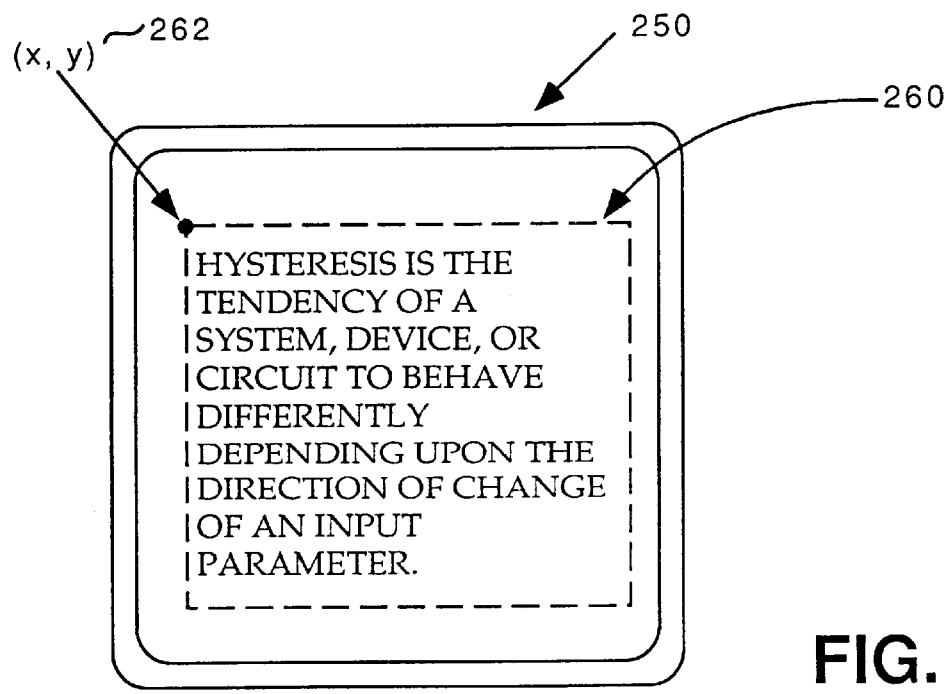

FIG. 2 illustrates an example where the source and destination computers do not have the same font as specified by the text output message. In accordance with the text output message, a body of text 220 is displayed at a first position 222 on source display 210. Body of text 220 uses a given area of the source display. Ideally, the destination display 250 serves as a model of the source display 210.

Although the body of text 260 displayed on destination display 250 is located at the corresponding first position 262, the body of text 260 is noticeable different from the body of text 220. In particular, body of text 260 uses a font which is slightly different than the font used in body of text 220. This font substitution may have been necessary, if the destination computer did not have the same fonts as the source computer. Because of the graphical user interface, the body of text 260 should not use proportionately any more display area than the body of text 220 uses on the source display. (The term "proportionate" is used here because the device driver 138 may be scaling graphics-oriented output to accommodate a different sized display). Because of the limitation of using the same given or proportionately-sized display area, the font substitution results in a portions of the text contained within body of text 220 being "chopped off" when displayed in a different font as body of text 260. In particular, a bottom portion and a right portion of the text is chopped off due to the substituted font and the limitations in proportionate display area consumption for display of the bodies of text 220 and 260. Thus the use of a different font results in inaccurate modeling of the source display 210 by the destination display 250.

The term "font" is intended to refer to a set of characters or glyphs having the same typeface, style, stroke weight, and size. Typeface refers to the design of the glyphs. Examples of typefaces include Courier, Times, Palatino, Helvetica, etc. "Style" determines whether the characters are underlined, italicized, strikethrough (e.g., "abc"), etc. "Stroke weight" refers to the "boldness" of the character. For example, when published, many numbers appearing throughout the patent will appear in bold typeface. "Size" refers to the point size, or height of the characters. The term "glyph" is used to refer to an individual character within a font. The characters "a," "1," "Σ," and "@" are all examples of glyphs for a given font.

Some attributes of displayed glyphs are independent of the font. For example, color, shading, and transparency of a glyph are controlled by other attributes which are not specific to the glyph. Font independent attributes such as color, shading, and transparency are generally controlled by the component of operating system software associated with generating graphics output to the display or printer. For example, foreground and background colors are typically specified by attributes of the destination output device. More than two colors can be realized by using a glyph bitmap of the appropriate color depth.

Figure 3:
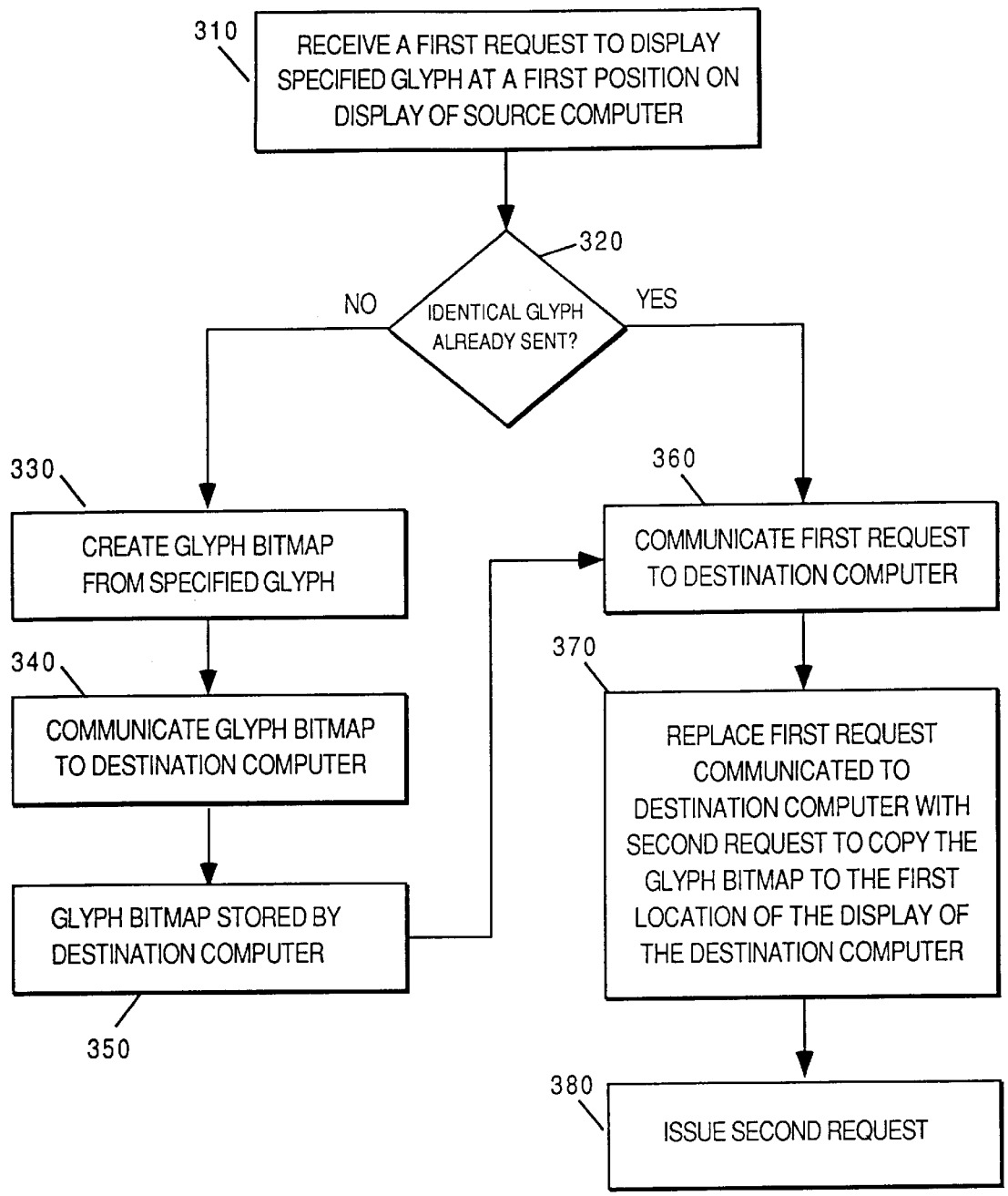
FIG. 3 is a flowchart for a method of sharing glyphs between computers having graphical user interfaces.

One method of overcoming the font substitution problem for operating systems having a graphical user interface is illustrated in FIG. 3. The method is applicable to any operating system having a graphical user interface as long as messages or function calls to send text output to the display can be hooked or intercepted. These messages or function calls are therefore referred to generically as "requests."

At step 310, a first request is received from an application program on the source computer. In particular, the first request is a function call or a message requesting the display of a specified glyph at a first position on the display of the source computer.

At step 320, a determination is made as to whether an identical glyph was previously communicated to the destination computer. In order to be identical, the previous glyph must have been the same glyph within the same font (i.e., same typeface, style, stroke weight, and size) as the specified glyph.

If the identical glyph was not previously sent to the destination computer, step 330 is the next step. In step 330, a glyph bitmap of the specified glyph is created. As stated above, color, shading, and transparency are font independent attributes. Therefore, the glyph bitmap need only be a monochrome bitmap. In one embodiment, the glyph bitmap is a monochrome bitmap. In step 340, the glyph bitmap is communicated to the destination computer. In step 350, the glyph bitmap is stored by the destination computer.

Once the destination computer has the glyph bitmap (i.e., proceeding from step 320 or 350) the first request is communicated to the destination computer in step 360. Instead of issuing the first request to the operating system, the first request is replaced with a second request in step 370. In particular, the received first request is replaced with a second request which instructs the operating system to copy the glyph bitmap to the first location of the display of the destination computer. In step 380, the second request is then issued to the operating system for processing.

In one embodiment the second request causes the operating system to perform a bit block transfer ("BitBlt") function to copy the glyph bitmap to video memory. The bit block transfer function copies the glyph bitmap to video memory as one rectangular block of bits. In one embodiment, the function called by the first request is replaced with the BitBlt function.

The use of the glyph bitmap avoids the font substitution problem illustrated in FIG. 2. In particular, an bitmap of the glyph used by the source computer is provided to the destination computer for display.

Figure 4:
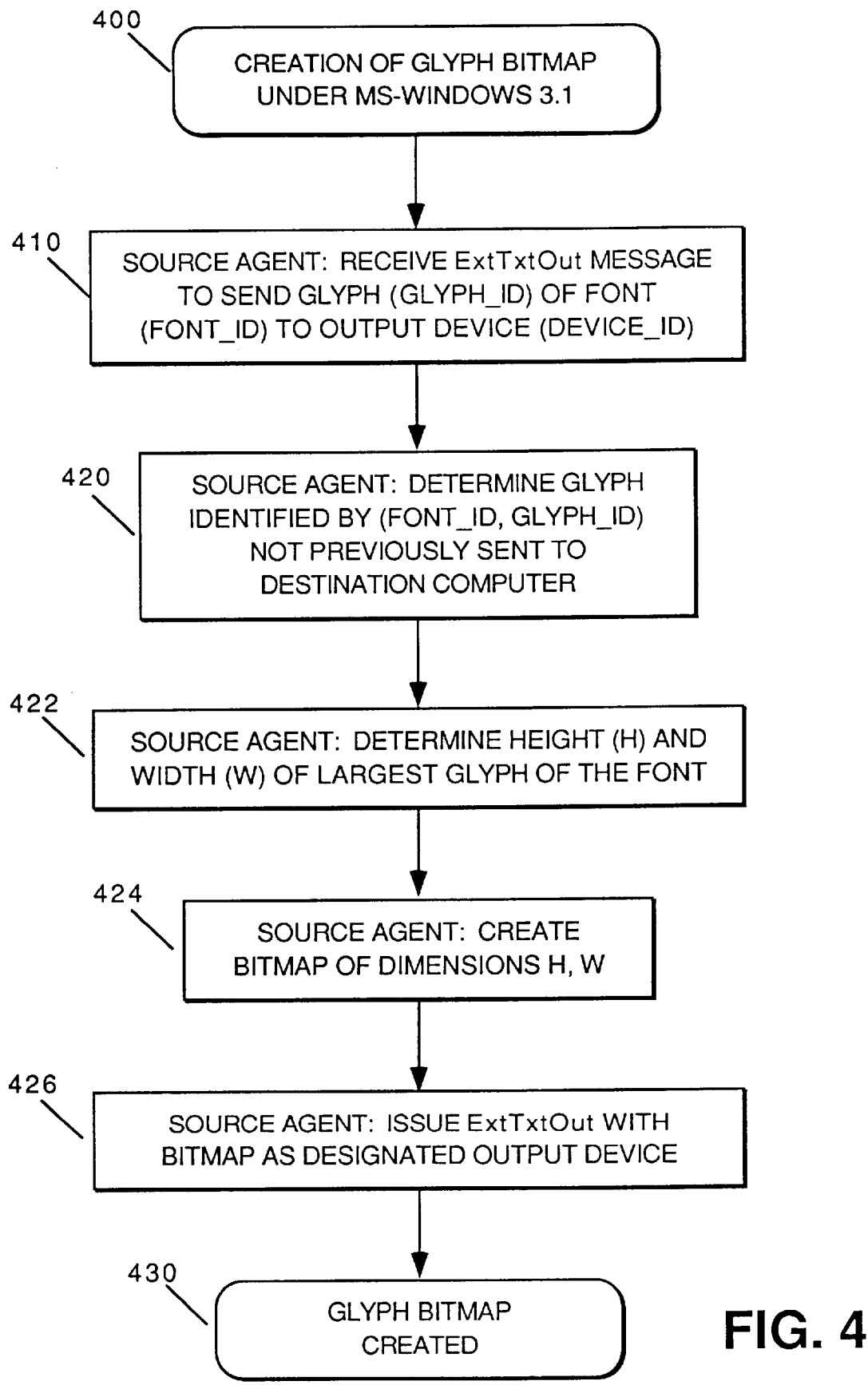
FIG. 4 illustrates an embodiment of a method for realizing the "create glyph bitmap" function for MS-Windows 3.1.

FIG. 4 illustrates a method 400 of creating a glyph bitmap using requests specific to Windows 3.1. In particular, the source agent residing on the source computer receives an ExtTxtOut request from an application in step 410. The ExtTxtOut request instructs the GDI to send one or more specified glyphs from a specified font to a specified output device. The glyphs are identified individually by a glyph identifier, GLYPH_ID. The fonts are individually specified using a font identifier, FONT_ID. A DEVICE_ID is a device identifier that specifies where the GDI is to output the text.

In step 420, the source agent determines that the identical glyph was not previously sent to the destination computer. (This corresponds to the "NO" branch from step 320 of FIG. 3). In one embodiment, this determination is made using an array (SENT_ARRAY) to indicate the "sent" status of each glyph for a specified font. The FONT_ID and GLYPH_ID serve as indices into the array. In one embodiment, a single bit is used to indicate the sent status for a specified glyph. Thus for a specified FONT_ID and GLYPH_ID, if SENT_ARRAY(FONT_ID, GLYPH_ID) is a set bit, then the identical glyph was previously sent.

In step 422, the height (H) and width (W) of the largest glyph of font FONT_ID is determined. This determines the maximum size required for the glyph bitmap. The source agent then creates a bitmap of dimensions H, W in step 424.

In step 426, the source agent sends an ExtTxtOut request designating the bitmap as the output device. This creates the desired glyph bitmap. Thus the use of an ExtTxtOut request to display a glyph for the first time on the source display will result in the generation of another ExtTxtOut request to create the glyph bitmap.

This technique of using an additional ExtTxtOut request allows the glyph bitmap creation method to be independent of the method by which the source computer is providing glyphs for display. For example, in some embodiments the source computer operating system may retrieve bitmaps of fonts loaded in memory or accessible by a file. In other embodiments, the source computer operating system might generate a specified glyph "on the fly." The technique of issuing the additional first request (e.g., ExtTxtOut) with the glyph bitmap as the output device permits creation of the glyph bitmap without knowledge of the specific methods used by the source computer to provide specified glyphs.

Figure 5:
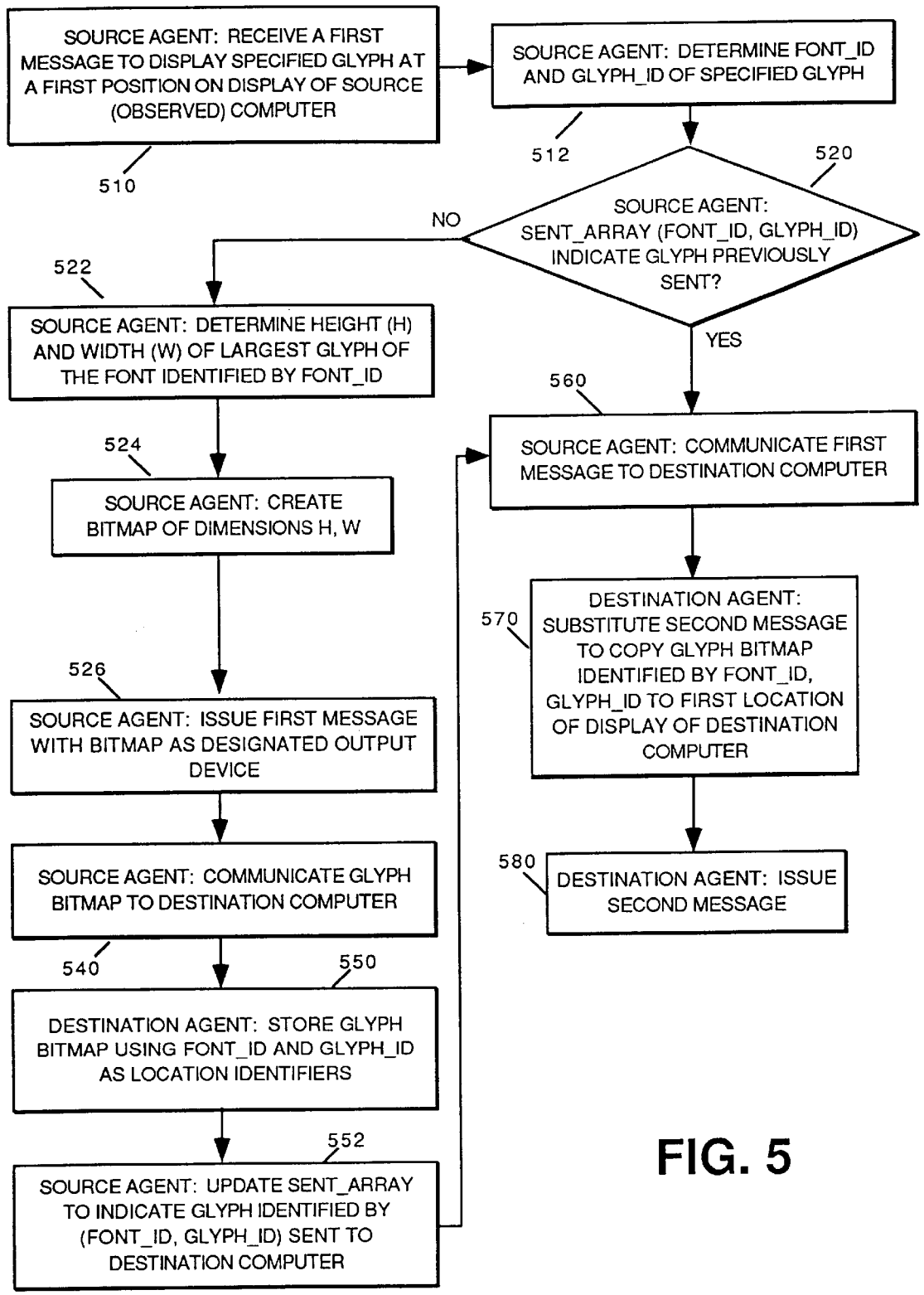
FIG. 5 is a flowchart for a method of sharing glyphs from a source computer graphical user interface with a destination computer graphical user interface.

FIG. 5 illustrates one embodiment of a generalized method of sharing glyphs between computers having graphical user interfaces. In the embodiment illustrated, the steps are performed by the source or destination agent, as indicated.

In step 510, the source agent receives a first request to display a specified glyph at a first position on the source display. In step 512, the source agent determines the FONT_ID and the GLYPH_ID of the specified glyph.

In step 520, the source agent determines if the identical glyph was previously sent. This might be accomplished, for example, using an array (SENT_ARRAY) to store the sent status of individual glyphs. In one embodiment, FONT_ID and GLYPH_ID serve as indices into SENT_ARRAY. Thus the "sent" status of a particular glyph is determined by examining the value stored at SENT_ARRAY(FONT_ID, GLYPH_ID). In one embodiment, the sent status is indicated by a single bit for each specified glyph.

If the identical glyph was not previously sent to the destination computer, processing continues with step 522 to create the glyph bitmap. In step 522, the source agent determines the height (H) and width (W) of the largest glyph of the font identified by FONT_ID.

In step 524, the source agent creates a bitmap of dimensions H, W. In step 526, the source agent issues the first request designating the bitmap as the output device. Once the source computer operating system acts upon this request, the glyph bitmap is created. In step 540, the source agent communicates the glyph bitmap to the observing (destination) computer.

In step 550, the destination agent stores the glyph bitmap using FONT_ID and GLYPH_ID as location identifiers. In one embodiment, each received glyph bitmap is appended onto a cached font bitmap stored within the destination computer. The font bitmap represents other glyphs having the same FONT_ID. The FONT_ID can thus be used to identify a specific cached font bitmap. The GLYPH_ID can then be used to locate the glyph bitmap within the specified font bitmap.

In step 552, the source agent updates the SENT_ARRAY to indicate that the glyph identified by (FONT_ID, GLYPH_ID) has been sent to the destination computer.

Once the destination computer has the glyph bitmap (i.e., proceeding from step 520 or 552) the source agent communicates the first request to the destination computer in step 560.

Instead of issuing the first request to the destination computer operating system, however, the destination agent replaces the received first request in step 570. In particular, the destination agent substitutes a second request to copy the glyph bitmap identified by (FONT_ID, GLYPH_ID) to the first location of the destination computer display. In one embodiment, second request is a request to copy the specified glyph from the cached font bitmap to the first location of the destination computer display. The destination agent then issues the second request to the operating system in step 580 for processing.

The method illustrated in FIG. 5 removes dependence upon specific font data structures so that the method is generally applicable to sharing glyphs between computers having graphical user interfaces when the source and destination computers use similar or identical operating systems.

Figure 6:
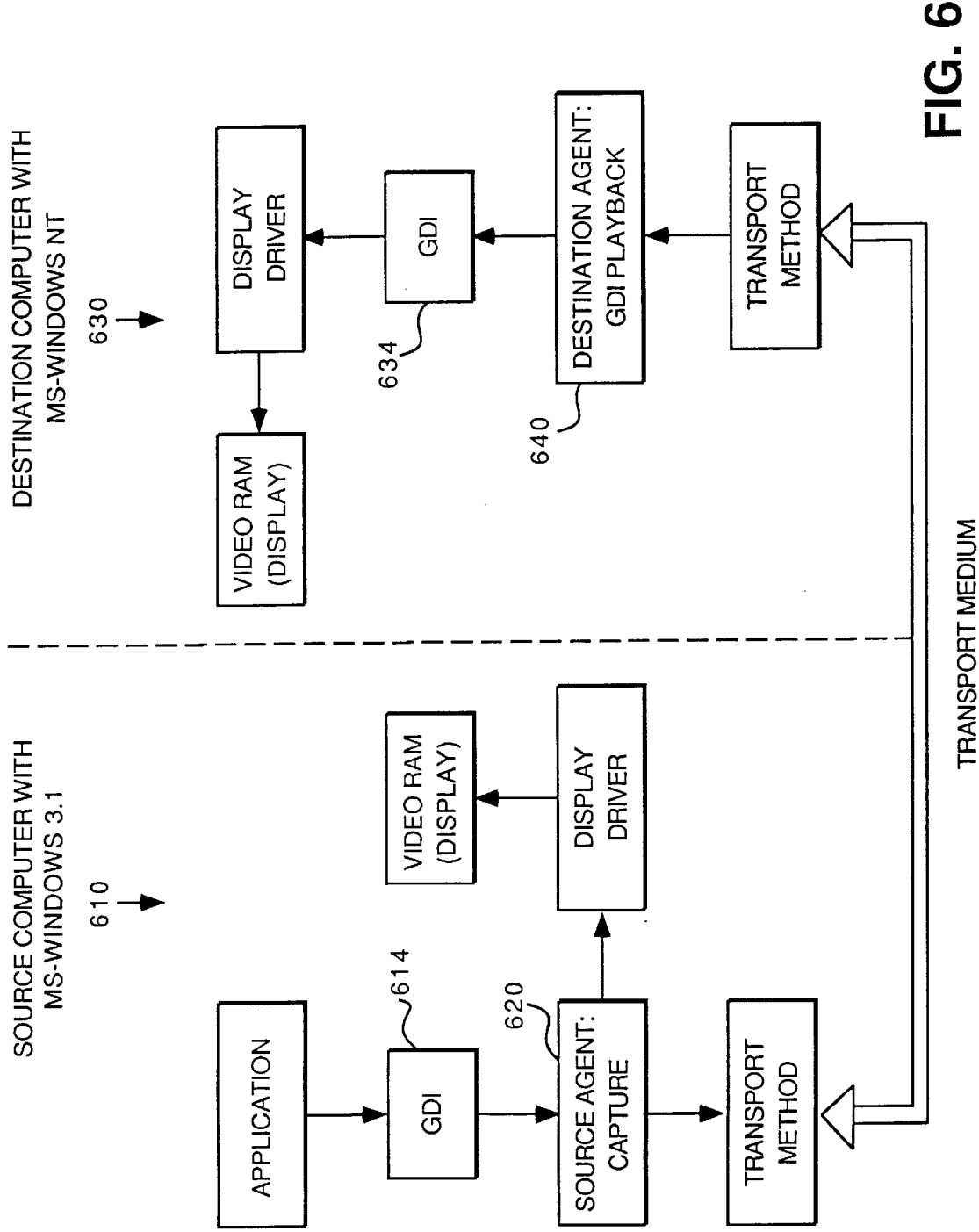
FIG. 6 illustrates an architectural data flow diagram for communicating requests issued by a source computer operating system to a destination computer having a similar operating system.

For example, FIG. 6 illustrates one embodiment of a system wherein the source and destination computers use similar, but not identical, operating systems. In particular, source computer 610 uses Windows 95. Destination computer 630 uses Microsoft® Windows® NT (hereinafter "Windows NT"). Both operating systems are architecturally similar in that a Graphics Device Interface component is used for handling the rendering of graphics objects. Thus there is a source computer GDI 614 and a destination computer GDI 634.

Although the operating systems have some architectural similarities, the messages, functions, or data structures used by each may not be identical. For example Windows 95 and Windows NT use subsets of an API referred to as the Win32 API. Although the functions have similar names and are largely compatible, there are slight differences in the implementation of various API functions within each operating system. In particular, Windows 95 uses font data structures that are incompatible with the font data structures used by Windows NT. This prevents the Windows NT destination computer from using font data structures sent by a Windows 95 source computer.

The method illustrated in FIG. 5, however, is not dependent upon font data structures. Furthermore, many of the GDI API messages or functions belong to a common set of application programming interface functions which are supported by both of the similar operating systems. In such a case, the "first request" performs the same function on both computers and no additional translation is needed. Destination agent 640 replaces the "first request" with the request to copy the specified glyphs from a font bitmap stored by the destination computer. Destination agent 640 permits a "playback" to the destination display of the text outputted on the source display. Thus the method illustrated in FIG. 5 is applicable to operating systems which have similar APIs for outputting text to the display.

Figure 7:
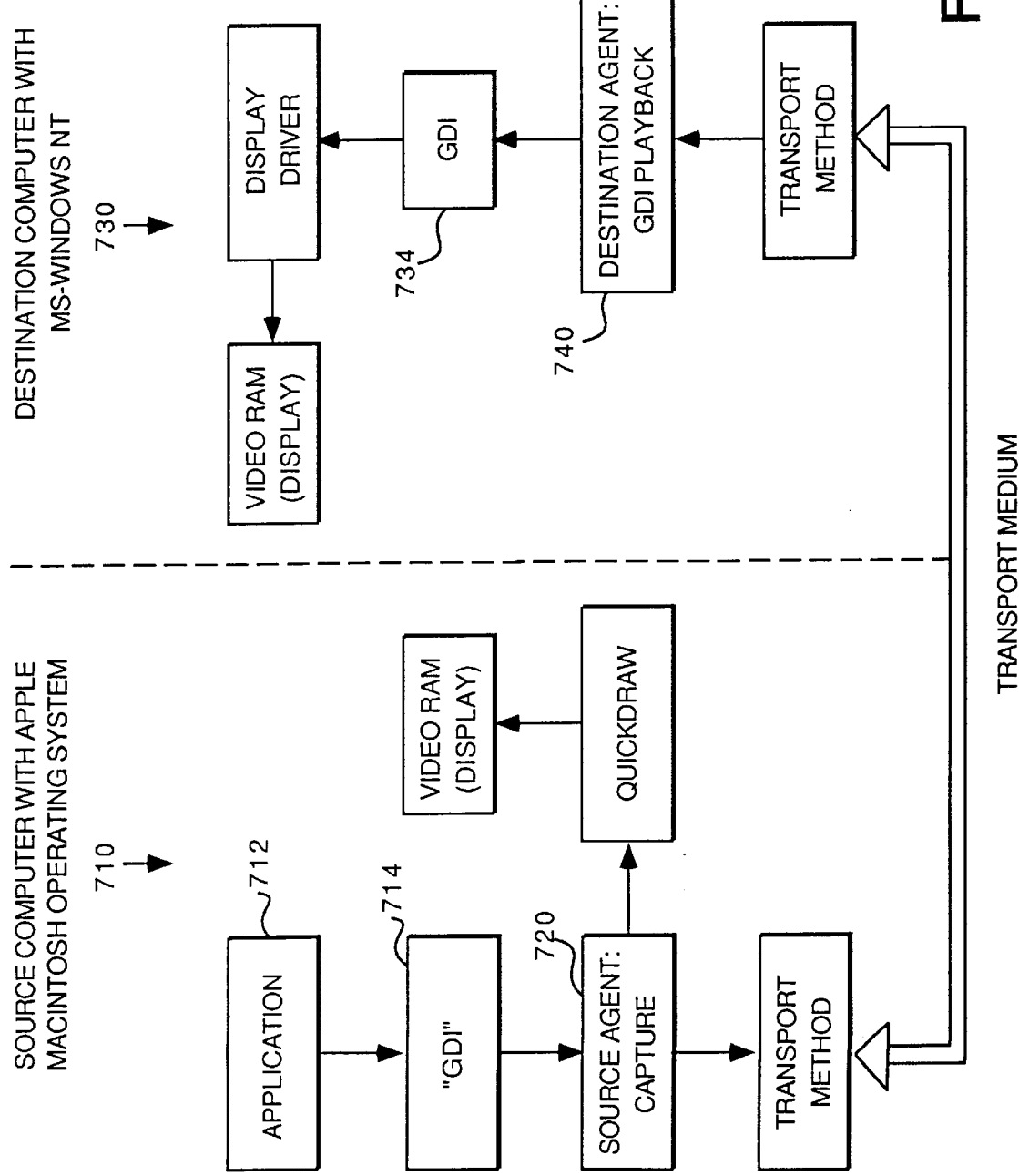
FIG. 7 illustrates a data flow diagram for communicating requests issued by a source computer operating system to a destination computer having an architecturally different operating system.

The method illustrated in FIG. 5 is also generally applicable to entirely different operating systems. FIG. 7 illustrates an architectural data flow diagram with source computer 710 using the Apple® Macintosh® (hereinafter "Macintosh") operating system. Destination computer 730 is using the Windows NT operating system.

The Macintosh operating system also has a component devoted primarily to graphics control. Although not identical to the Windows GDI, this component is referred to as the "GDI" component for purposes of this example. "GDI" 714 responds to text output requests issued by application 712. "GDI" 714 composes the text in accordance with the text output request for the Quickdraw 718 display driver. Source agent 720 intercepts the text output requests to Quickdraw 718 from "GDI" 714. Source agent 720 provides the intercepted text output request to Quickdraw 718, the display driver. Quickdraw 718 creates an image specific to the configured source display device. Quickdraw 718 then sends the image to video memory 716 which is associated with the source display.

Source agent 720 also communicates the text output request to destination agent 740. Because the operating systems are radically different, the graphics-oriented request provided by source agent 720 is not recognizable by the destination computer operating system. Therefore translation of the request is required. The translation might be performed by source agent 720 or destination agent 740. In one embodiment, the source agent 720 performs the translation into a request compatible with the destination computer operating system. In an alternative embodiment, destination agent 740 performs the translation into a request compatible with the destination computer operating system. Destination agent 740 then issues the translated graphics-oriented request to GDI 734.

Although all graphics-oriented commands may not be translatable between the two operating systems, text output requests are a relatively simple translation between the two operating systems. Thus with the addition of a translation step, the methods presented above are applicable to two very different operating systems.

Figure 8:
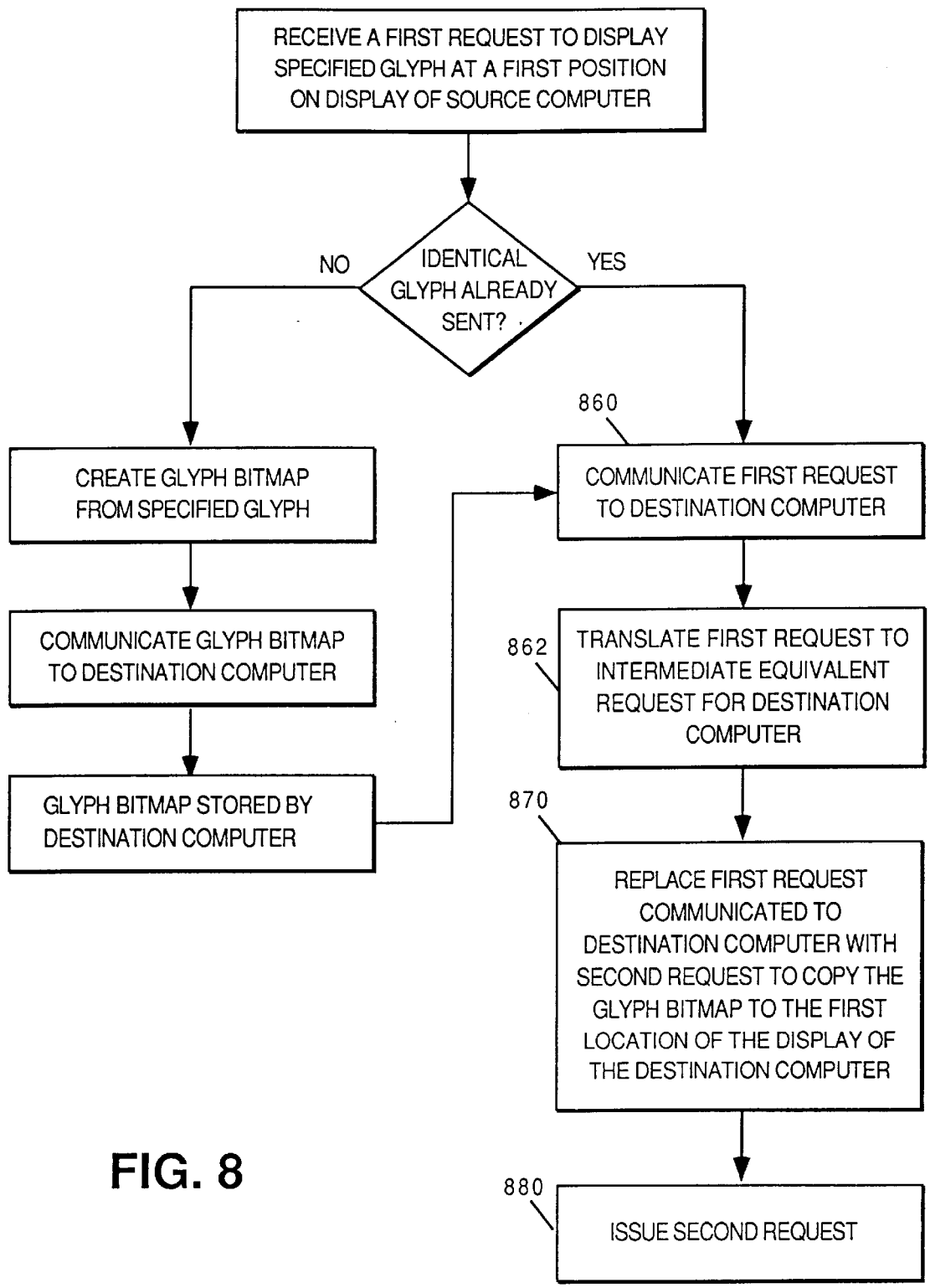
FIG. 8 is a flowchart for a method of sharing glyphs from a source computer graphical user interface with a destination computer graphical user interface when the source and destination computer have substantially different operating systems.

FIG. 8 is a flowchart for a method of sharing glyphs between computers having graphical user interfaces when the source and destination computers have very different operating systems.

FIG. 8 is identical to FIG. 3 thru step 860. Once the source agent has communicated the first request to the destination computer, however, a translation must be performed.

In step 862, a translation step is added to translate the first request into an intermediate equivalent request for the destination computer. The intermediate request effectively requests the destination computer operating system to display a specified glyph at a first position on the display of the destination computer. The translation step might be performed by the source agent or the destination agent. In one embodiment, the translation is performed by the source agent. In an alternative embodiment, the translation is performed by the destination agent.

In step 870, the destination agent replaces this intermediate request with a second request. The second request instructs the destination computer operating system to copy the glyph bitmap to the first location on the destination computer display. In step 880, the destination agent then issues the second request for action by the operating system. Essentially the first request is translated into an intermediate request compatible with the destination computer operating system. The intermediate request is then replaced with a second request so that the overall effect is to replace the first request with a second request.

The methods presented above are applicable to operating systems having a graphical user interface as long as graphics-oriented messages or functions can be hooked, intercepted, or captured. Thus the additional translation step 862 permits sharing glyphs between computers having the same, similar, or even very different operating systems.

In the preceding detailed description, the invention is described with reference to specific exemplary embodiments thereof. Various modification and changes may be made thereto without departing from the broader spirit and scope of the invention as set forth in the claims. The specification and drawings are, accordingly, to be regarded in an illustrative rather than a restrictive sense.

What is claimed is:

1. A method of synchronizing glyph displays between a source computer and a destination computer, comprising:

receiving a first glyph-oriented request to display a specified glyph at a first position of a source computer display, said specified glyph having associated display characteristics;

sending the first glyph-oriented request to the destination computer;

creating a glyph bitmap from the specified glyph, if the specified glyph is not supported by the destination computer and the glyph bitmap was not previously created and sent to the destination computer;

sending the glyph bitmap to the destination computer; and replacing, by the destination computer, the first glyph-oriented request with a second bit-map oriented request to render the glyph bitmap to effectuate display of the unsupported specified glyph at a second position on a destination computer display corresponding to the first position of the source computer display.

2. The method of claim 1, wherein creating the glyph bitmap further comprises the step of:

determining if the glyph has been cached on the destination computer by comparing the glyph's font and glyph identifiers to a previously sent glyph.

3. The method of claim 2, wherein determining if the glyph has been stored further comprises the step of:

determining if the glyph and the previously sent glyph have a same attribute selected from a group consisting of typeface, size, stroke weight, and style.

4. The method of claim 1 wherein creating a glyph bitmap for glyphs unsupported by the destination computer further comprises the steps of:

determining height (H) and width (W) of a largest glyph of a same font as the specified glyph;

creating a bitmap of height H and width W; and issuing, by the destination computer, the first glyph-oriented request designating the bitmap as an output device to create the glyph bitmap.

5. The method of claim 1, further comprising:

appending the glyph bitmap to a font bitmap;

wherein each glyph bitmap of the font bitmap has a same typeface, a same size, a same stroke weight, and a same style.

6. The method of claim 5, further comprising:

issuing the second bitmap-oriented request;

wherein the glyph bitmap is copied from the font bitmap to the second position of the destination computer display in accordance with the second bitmap-oriented request.

7. The method of claim 1, wherein replacing the first glyph-oriented request further comprises the step of:

translating the first glyph-oriented request to an intermediate message format compatible with a destination computer operating system.

8. The method of claim 1, wherein the glyph bitmap created from the specified glyph is a monochrome bitmap.

9. The method of claim 8, wherein the source computer has a first operating system different from a second operating system for the destination computer.

10. A computer network, comprising:

a source computer including a source display, wherein the source computer has a first graphical user interface which displays a specified glyph at a first location of the source display in response to a first glyph-oriented request;

a destination computer including a destination display, wherein the destination computer has a second graphical user interface;

a source agent loaded on the source computer, wherein the source agent communicates the first glyph-oriented request to the destination computer, wherein the source agent provides a glyph bitmap of the specified glyph to the destination computer if the specified glyph is not supported by the destination computer and the glyph bitmap was not previously sent to the destination computer; and a destination agent loaded on the destination computer, wherein the destination agent stores the glyph bitmap as a portion of a font bitmap for the destination computer, wherein the destination agent replaces the received first request with a second bitmap-oriented request to render the glyph bitmap from the font bitmap to effectuate display of the unsupported specified glyph on the destination display.

11. The computer network of claim 9, wherein the source and destination computers have different operating systems.

12. The computer network of claim 9, wherein the first and second computers have a different set of fonts.

13. A method of synchronizing glyph displays between a source computer and a destination computer having graphical user interfaces utilizing incompatible methods for displaying font output, the method comprising:

a) receiving a first glyph-oriented request to display a plurality of glyphs starting at a first position of a source computer display;

b) performing the following steps for each selected glyph of the plurality of glyphs, if an identical glyph corresponding to the selected glyph was not previously sent to the destination computer;

(i) creating a glyph bitmap for the selected glyph;

(ii) sending the glyph bitmap to the destination computer;

(iii) storing the glyph bitmap such that there is a stored glyph bitmap for each selected glyph of the plurality of glyphs;

c) sending the first glyph-oriented request to the destination computer; and d) replacing the first glyph-oriented request received by the destination computer with a plurality of bitmap-oriented requests to render the stored glyph bitmaps to effectuate display of unsupported specified glyphs starting at a corresponding first position of the destination computer display.

14. The method of claim 13, wherein operation b) further comprises the step of determining if a previously sent glyph having a same glyph identifier as the selected glyph is of a same font as the selected glyph.

15. The method of claim 14, further comprising:

determining if the selected glyph and the previously sent glyph have a same typeface.

16. The method of claim 14, further comprising:

determining if the selected glyph and the previously sent glyph have a same size.

17. The method of claim 14, further comprising:

determining if the selected glyph and the previously sent glyph have a same stroke weight.

18. The method of claim 14, further comprising:

determining if the selected glyph and the previously sent glyph have a same style.

19. The method of claim 13, wherein step b)(i) further comprises:

1) issuing an output request with the selected glyph designating a bitmap of height H and width W as an output device to create the glyph bitmap, wherein H and W correspond to the height and width of a largest glyph of a same font as the selected glyph.

20. The method of claim 13, wherein step b)(iii) further comprises the step of:

1) appending the glyph bitmap to a font bitmap, wherein each glyph bitmap of the font bitmap has a same typeface, a same size, a same stroke weight, and a same style.

21. A method of synchronizing glyph displays between a source computer and a destination computer having incompatible graphical user interfaces, where graphics display calls utilized by the source computer cannot be processed by a destination computer graphical interface, the method comprising:

step for receiving a first glyph-oriented request to display a plurality of glyphs starting at a first position of a source computer display;

step for performing the following steps for each selected glyph of the plurality of glyphs, if an identical glyph corresponding to the selected glyph was not previously sent to the destination computer:

creating a glyph bitmap for the selected glyph if the specified glyph is not supported by the destination computer, sending the glyph bitmap to the destination computer, and storing the glyph bitmap such that there is a stored glyph bitmap for each selected glyph of the plurality of glyphs;

step for sending the first glyph-oriented request to the destination computer; and step for replacing the first glyph-oriented request received by the destination computer with a plurality of bitmap-oriented requests to render the stored glyph bitmaps to effectuate display of the unsupported specified glyphs on the destination computer display starting at the first position.

22. A method according to claim 21, further comprising:

step for determining if a previously sent glyph has a same attribute as the selected glyph, such attribute selected from a group consisting of glyph identifier, font, typeface, size, stroke weight, and style.

23. An article of manufacture comprising a computer-readable medium having instructions encoded thereon for causing a processor to perform the operations of claim 21.

24. An apparatus for of synchronizing glyph displays between a source computer and a destination computer, comprising:

means for receiving a glyph-oriented request to display a glyph a first position of a source display;

means for creating a glyph bitmap for the glyph if the specified glyph is not supported by the destination computer;

means for sending the unsupported glyph bitmap to the destination computer;

means for storing the unsupported glyph bitmap on the destination computer;

means for sending the glyph-oriented request to the destination computer; and means for effectuating display of the unsupported glyph bitmap at a second position on a destination display, such second position corresponding to the first position on the source display.

25. An article of manufacture comprising a computer-readable medium having instructions encoded thereon for causing a processor to perform the steps of claim 21.

* * * * *